Jan. 14, 1969  E. A. BREACKER ET AL  3,421,709
REWINDING MACHINES
Filed Oct. 13, 1966  Sheet 1 of 2

INVENTORS
Edward Albert Breacker
Edouard Roger Armelin
BY
Watson, Cole, Grindle + Watson
ATTORNEYS

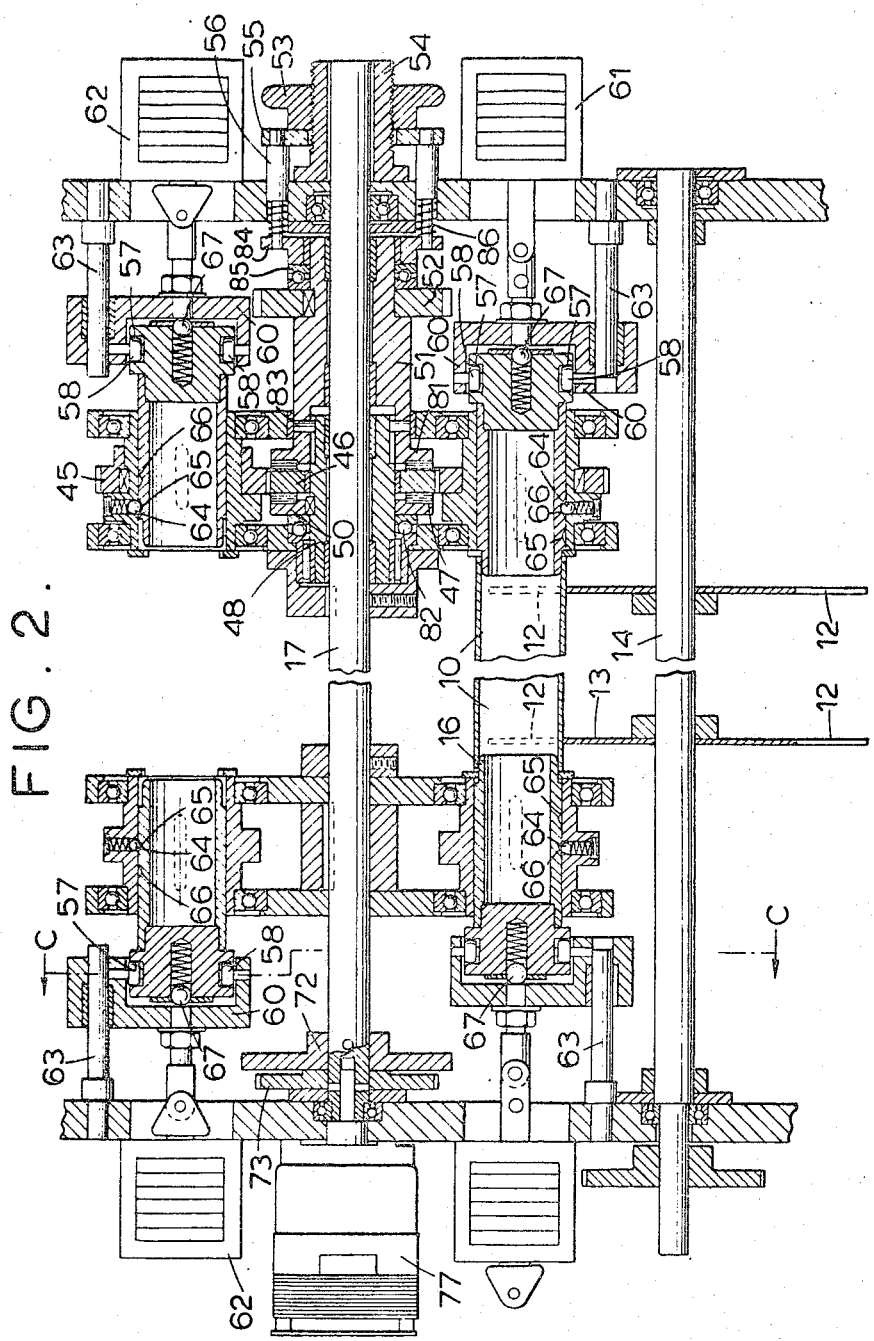

United States Patent Office 3,421,709
Patented Jan. 14, 1969

3,421,709
REWINDING MACHINES
Edward Albert Breacker and Edouard Armelin, London, England, assignors to Societe d'Etudes de Machines Speciales, Paris, France, a French company
Filed Oct. 13, 1966, Ser. No. 586,427
Claims priority, application Great Britain, Oct. 13, 1965, 43,437/65
U.S. Cl. 242—64                            9 Claims
Int. Cl. B65h 65/00; B65h 67/06; B65h 75/18

ABSTRACT OF THE DISCLOSURE

An apparatus for winding a web of material onto cores in which a plurality of mandrels adapted to receive the cores, are supported on a rotating turret and are continuously driven while the turret is indexed successively to different stations at which the respective mandrels receive cores, each said core then receiving the end of the web which is wound around it, after which the core is released. Means are included for applying adhesive to the core with which to attach the web end to it. The means for loading the cores onto the mandrels of the rotating turret comprises two disks mounted for rotation together in synchronism with the turret, the disks having a plurality of recesses in their peripheries for positioning of the cores so that upon rotation of the disks, the cores are presented to the respective mandrels at a core receiving a station.

---

This invention relates to a machine for winding webs, such as thin metal foil, into rolls of a required size from a large roll or other source. Metal foil is usually supplied from foil manufacturers in large rolls which need to be rewound onto cores, such as cardboard cylinders, the foil being wound on to such a core in any required length so that the rewound foil can be wrapped ready for sale for domestic or other uses.

Accordingly the present invention provides apparatus for winding a web of material onto a core comprising a rotatable turret having a plurality of mandrels mounted for rotation thereon and adapted to receive a core, means for driving said mandrels continuously, means for indexing said turret to successive stations at which respectively said mandrels receive a core, said core receives the end of a web to be wound onto that core, and said core is released when wound with said web, and means for applying adhesive to said core with which to attach said web end thereto.

Features and advantages of the present invention will be apparent from the following description of one embodiment given by way of example only, with reference to the accompanying drawings, in which, FIGURE 1 is a vertical longitudinal section through a machine constructed in accordance with the invention;

FIGURE 2 is a transverse section along the line B—B of FIGURE 1; and

Figures 1, 3:
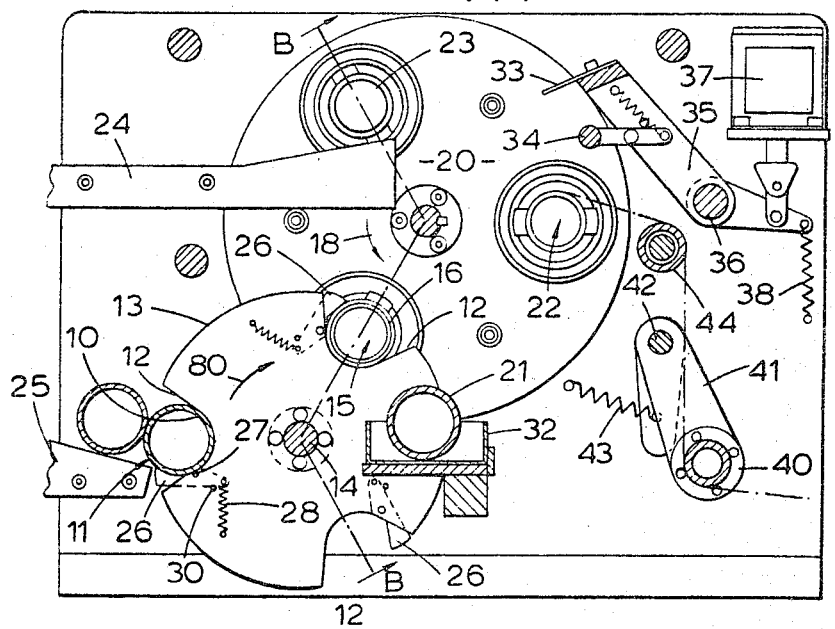
FIGURE 3 is a vertical longitudinal section along the line C—C of FIGURE 2.

Referring to FIGURE 1 an empty cylindrical cardboard core 10 onto which foil is to be wound, is loaded onto the machine by rolling it under gravity down a rail into a loading station 11 of a loading means where it is received in one pair of three pairs of aligned recesses 12 equally spaced around the edges of two parallel discs 13, mounted one at either end of a shaft 14.

The discs 13 can be rotated in the direction of arrow 80 by the shaft 14 on which they are rigidly secured; and they then move the empty core 10 into a core receiving station shown generally at 15, where that core 10 is axially gripped between one pair of three pairs of mandrels 16 which are rotatably and axially movably mounted on and equally spaced around a turret. The turret comprises two pairs of end plates 20 mounted one pair in assembly at each end of a shaft 17 in such a manner that the turret thus formed may be indexed by rotating the shaft 17.

One of each pair of mandrels 16 is mounted in one pair or assembly of end plates 20 and the other of each pair of mandrels 16 is mounted in the other pair or assembly of end plates 20. These mandrels 16 which are mounted in the right-hand (as seen in FIGURE 2) assembly of end plates 20 are each continuously driven so as to rotate a core gripped between any pair of mandrels 16, the corresponding mandrels which are mounted in the left-hand assembly of end plates rotating freely with the core.

After the core 10 has been gripped and picked up by a pair of mandrels 16, the turret indexes on the shaft 17 in the direction of the arrow 18, taking the core with it. The empty core 10 picks up an axial strip of adhesive from an adhesive roller 21 as it passes and is moved into a foil receiving station shown generally at 22, whereupon movement about shaft 17 stops. The foil being wound onto a previous core is then cut off and the freshly cut end of the foil to be wound is pressed against the empty core 10 so that it adheres to the axial strip of adhesive thereon. Thereupon index movement about shaft 17 restarts thus moving the core 10 which is then being wound with foil, towards a core release station shown generally at 23. On arrival at the core release station 23, movement about shaft 17 again stops and when the correct amount of foil has been wound on the core 10, the foil is cut off and that pair of the mandrels 16 at station 23 are withdrawn axially so as to free the wound core and to enable it to be removed from the turret along a discharge chute 24.

In loading the machine the empty cores are loaded by rolling under gravity down a delivery rail 25 and when an empty core is in one pair of the three pairs of recesses 12 in discs 13 it is lightly held under spring loaded catches 26 which retain the core in position within the recesses 12 during rotation of the discs. The catches 26 are pivoted at point 27 on the discs 13 and are spring loaded by springs 28. Movement of the catches by the springs 28 is limited by stop pins 30 mounted on the discs 13 which are so positioned that the presence of a core in a recess 12 just displaces the catch 26 from contacting the pin 30 but when the core is removed the pin 38 prevents the catch 26 from moving too far across the recess 12 as this would prevent the entry of a core.

One empty core 10 is shown in the lower part of FIGURE 2 being held by a pair of the mandrels 16 which move axially and enter the ends of the core. This lower part of FIGURE 2 also shows the core receiving station 15 with the empty core held by the pair of mandrels 16 but still lying within the recesses 12 of the discs 13. On moving away from the core receiving station 15, the empty core picks up the axial strip of adhesive as mentioned above by contacting the freely rotatable adhesive roller 21 which runs in an adhesive reservoir trough 32 and is arranged so that the periphery of the empty core comes into contact with the roll 21 along the whole of its axial length and a strip of adhesive is thus passed to the core over a predetermined portion of its periphery.

When an empty core arrives at the foil receiving station 22, the foil is still being wound on to the previous core at the core release station 23 of the mandrel turret. When the correct amount of foil has been wound onto that core, the foil is cut off by a downward movement of a knife 33 and the freshly cut foil end is pressed against the empty core at the core receiving station 22 by a spring loaded roller 34. In this way the cut off foil end becomes secured to the adhesive on the empty core and as this core is being rotated by the pair of mandrels 16 carrying it, foil is wound onto it from that time.

The knife 33 comprises a very thin blade which has a serrated edge (not shown) and it has been found that the rapid downward action of this serrated knife is sufficient to cut through the foil being wound and it is unnecessary for the usual two cooperating blades to be provided to perform the usual scissors action in order to cut the foil.

The knife 33 is carried on an arm 35 which also carries the spring loaded roller 34 mounted on a pivoted roller arm, and this arm 35 is pivoted on a spindle 36 and can be rotated about this spindle to bring the knife and roller into contact with the foil by means of a solenoid 37 acting against a spring 38 which normally keeps the knife 33 and the roller 34 clear of the foil.

The foil path in reaching the core onto which it is wound is from a large reel of foil (not shown) over a freely rotatable roller 40, which is carried by an arm 41 which is pivoted at 42 and is spring-loaded by a spring 43, and then over a further freely rotatable roller 44. The mandrels 16 carried by the right-hand end plates 20, are rotated about their axis by gears 45 which are keyed to them and which are themselves planet wheels meshed with a sun wheel 46 which is concentric with the turret. The sun wheel 46 is driven through a friction clutch device which is arranged to allow some slip because it is found that the drive speed of the mandrels 16 should be arranged to be just slightly greater than the speed at which the foil is delivering so as to maintain a tension in the foil and to wind it tightly onto the cores.

The friction clutch device comprises two clutch friction plates 47 positioned one on either side of the sun gear 46 which is rotatably carried on a sleeve 48 which is itself rotatably carried on the shaft 17. The two friction plates 47 and the sun gear 46 therebetween are compressed between a thrust plate 50 and a flange 81 provided on one end of a drive sleeve 51 which is also rotatably mounted on the shaft 17. A thrust bearing 82 is interposed between thrust plate 50 and the inner of the right-hand assembly of end plates 20, and the thrust plate 50 is keyed to and rotates with the sleeve 48. The drive sleeve 51 is axially movable relative to the sleeve 48 and rotatably coupled to it by pegs 83 carried in the drive sleeve 51 and engaging in key-ways cut in the sleeve 48. The drive sleeve 51 is driven from a train of gears (not shown) from a main motor (not shown) by way of a gear 52 which is keyed to the drive sleeve.

A pressure ring 84 abuts the gear 52 by way of a second thrust bearing 85, and is urged to the left, as seen in FIGURE 2, by two or more springs 86. The arrangement is such therefore, that the compression provided in the springs 86 controls the force exerted on the friction plate 47 and thus the torque which can be transmitted from the gear 52 to the gears 45 driving the mandrels 16. The reaction of each spring 86 is taken by a shoulder formed on a rod 56 which passes through a bore in the frame of the machine. The ends of the rods 56 are carried in a plate 55 which abuts an adjustable handle wheel 53 which is threaded onto a spigot 54 provided on the machine frame. The opposite ends of the rods 56 which are reduced in diameter to form the spring shoulders, pass through the springs 86 and then through bores provided in the pressure ring 85. Thus it can be seen that the rods 56 prevent the pressure ring 85 from rotating, and also that adjustment of the hand wheel 53 will adjust the tension in the springs 86 and therefore the torque transmitted by the drive.

Each of the mandrels 16 has an annular groove 57 at its outer end and when a mandrel is in either the core receiving station 15 or the core releasing station 23, the mandrel becomes operatively connected to a solenoid by rollers 58 attached inside the arms of a C-shaped member 60, engaging with the groove 57. The C-shaped members 60 are respectively connected in the core receiving station 15 to thrust solenoid 61 and in the core releasing station to pull-type solenoids 62. Thus when a pair of mandrels are at the core receiving station 15, operation of the respective solenoids 61 will move the mandrel 16 inward to grip an empty core 10, and when a pair of mandrels are in the core release station 23 operation of the respective solenoid 62 will withdraw the mandrels 16 to allow the wound core to be released. The solenoids 61 and 62 are so arranged that they return to their original position after the mandrels 16 which they have operated upon have indexed past the respective station on the turret, and in this way the solenoids become ready to receive the next pair of mandrels and perform their respective operations thereon. The C-shaped members 60 are guided on guide pins 63 to keep them correctly orientated, to receive the indexing mandrels.

The mandrels 16 are each retained in either the withdrawn outward or inward position by a spring loaded ball 64 which engages in either of two detents 65 and 66 spaced axially along the mandrels.

The grip of the mandrels 16 on the cylinder when the mandrels are advanced, is very light so that when the foil is attached to the core at the foil receiving station 22 and winding is taking place, and also during the time that the turret is moving, the tension in the foil is high and it is necessary to increase the grip of the mandrels on the core to prevent it slipping on the mandrels under the tension in the foil. This increase in tension is effected by displacing the mandrels 16 axially inwards by a small amount so that they grip the core more tightly. To this end a ball 67 on each mandrel comes into contact with a cam plate 68 (FIG. 3) when in the foil receiving station 22 thus to displace the mandrel slightly inwards and the increased grip is only released when the mandrel arrives at the core release station when the ball 67 comes off the cam plate 68. When the mandrel is slightly displaced in this manner the ball 64 will still locate in the detent 66 but it will not be seated fully in the centre of the detent.

Alignment of the turret into any one of its three rest positions is provided and this also at the same time correctly aligns the discs 13 as the shaft 14 is geared to the turret. The alignment is achieved by driving the turret slightly past the correct position and allowing the tension in the foil to rotate the turret backwards so that a pawl 70 (FIG. 3) engages one of three notches 71 on a cam plate 72 which is rigidly mounted on the shaft 17. Also shown in this figure is the train of gears 73 to 76 connecting shaft 17 (and hence the turret) to the shaft 14 carrying discs 13. Shaft 17 is driven for indexing by a main drive synchronous geared motor 77 (FIG. 2).

We claim:

1. Apparatus for winding a web of material on to a core, comprising a rotatable turret, having a plurality of mandrels mounted for rotation thereon, and adapted to receive a core, means for driving said mandrels continuously, means for indexing said turret to successive stations at which respectively said mandrels receive a core, said core receives the end of a web to be wound onto that core, and said core is released when wound with said web, means for applying adhesive to said core with which to attach said web end thereto, and loading means comprising two discs mounted for rotation with the shaft geared in synchronism with said turret, said discs having a plurality of recesses in their periphery, adapted to receive and retain cores presented to them on a rail, lift the cores as said discs are rotated and present them individually to said mandrels.

2. Apparatus for winding a web of material onto a core, comprising a rotatable turret having a plurality of mandrels mounted for rotation thereon and adapted to receive a core, means for driving said mandrels continuously, means for indexing said turret to successive stations, at which, respectively, said mandrels receive a core, said core receives the end of a web to be wound on to that core and said core is released when wound with said web, means for applying adhesive to said core with which to attach said web end thereto, said mandrels being in a plurality of pairs, each adapted to receive a core therebetween and one of each of said pairs of mandrels being driven by said mandrels driving means, said mandrels being slidably mounted in and keyed to sleeves rotatably carried in said turret, the mandrels of each pair being slidable to an inward position to grip a core therebetween and to an outward position to release or receive a core therebetween, each mandrel having a groove around its outer end which engages with a solenoid when that mandrel is at a position to release or receive a core, said groove engaging with two rollers carried one inside each arm of a C-shaped member which is attached to the armature of the respective solenoid.

3. Apparatus as claimed in claim 2, wherein said C-shaped members have guide pins passing slidably through them to ensure correct alignment for engaging said groove.

4. Apparatus for winding a web of material onto a core, comprising a rotatable turret, a plurality of pairs of sleeves rotatably mounted on said turret, a mandrel slidably mounted in each said sleeve and keyed thereto for rotation therewith, the mandrels in each said pair of sleeves being arranged to receive a core therebetween, means for indexing said turret to successive stations at which respectively said mandrels receive a core, said core receives the end of the web to be wound onto that core and said core is released when wound with said web, wherein the mandrels are slidably to an inward position to grip a core therebetween and to an outward position to receive or release a core therebetween and wherein a spring loaded ball is provided in each said sleeve and a detent is provided in each said mandrel for each said position to cooperate with said ball to resiliently retain each mandrel in each said position.

5. Apparatus as claimed in claim 4, wherein a groove is provided around each said mandrel at its outer end, a solenoid is provided at each end of said turret adjacent each of said core receiving and said core releasing stations, and a C-shaped member having a roller carried inside each arm thereof is attached to the armature of each of said solenoids, each said C-shaped member being arranged so that said rollers thereon engage said mandrel groove when at said respective station whereby said mandrel may be moved from one of said positions to the other by operation of said solenoid.

6. Apparatus as claimed in claim 5, wherein guide pins are provided which pass slidably through said C-shaped members to ensure correct alignment thereof for engaging with said grooves.

7. Apparatus as claimed in claim 5, wherein said solenoids are arranged to operate to move said mandrels to their inward position at said core receiving station and to operate to move said mandrels to their outward position at said core release station, and further arranged to return to their initial position after a mandrel they have operated upon has indexed on the turret out of engagement therewith, in order to engage with the next mandrel indexing towards them.

8. Apparatus as claimed in claim 4, wherein a cam track is provided to engage with each mandrel of each said pair of mandrels as they are at and indexed from said web receiving station, to move said mandrels inwards and increase their grip on a core therebetween.

9. Apparatus as claimed in claim 4, wherein loading means is provided comprising two discs mounted for rotation on a shaft in geared synchronism with said turret, said discs having a plurality of recesses in their periphery adapted to receive and retain cores presented to them on a rail, lift the cores as said discs are rotated and present them individually between a pair of said mandrels at said core receiving station.

References Cited

UNITED STATES PATENTS

| | | | |
|---|---|---|---|
| 1,966,525 | 7/1934 | Schultz et al. | 242—56 |
| 2,237,759 | 4/1941 | Kwitek | 242—56 |
| 2,332,371 | 10/1943 | Corbin et al. | 242—64 X |
| 2,357,976 | 9/1944 | Roesen | 242—56 |
| 2,548,573 | 4/1951 | Wampole et al. | 242—75.5 X |
| 2,553,052 | 5/1951 | Kwitek | 242—56.6 X |
| 2,691,490 | 10/1954 | Gerard | 242—56 |
| 2,950,873 | 8/1960 | Nelson | 242—64 X |
| 2,969,930 | 1/1961 | Zernov | 242—56 |
| 3,246,858 | 4/1966 | Alexeff | 242—68.4 |

WILLIAM S. BURDEN, *Primary Examiner.*

U.S. Cl. X.R.

242—56, 68.4